United States Patent [19]

Miskimins

[11] Patent Number: 5,339,555
[45] Date of Patent: Aug. 23, 1994

[54] FISH HANDLER

[75] Inventor: Robert L. Miskimins, Alliance, Ohio

[73] Assignee: Ohio Electronics Machinery, Inc., Salem, Ohio

[21] Appl. No.: 92,989

[22] Filed: Jul. 19, 1993

[51] Int. Cl.5 .............................................. A01K 97/14
[52] U.S. Cl. ........................................ 43/5; D22/149; 294/26
[58] Field of Search ..................... 43/5, 53.5; 294/26, 294/158; D22/134, 149

[56] References Cited

U.S. PATENT DOCUMENTS

| | | | |
|---|---|---|---|
| D. 152,595 | 2/1949 | Lederblad | D22/149 |
| D. 175,801 | 10/1955 | Sharps | D22/134 |
| D. 199,737 | 12/1964 | Cross | 43/53.5 |
| 867,886 | 10/1907 | Kriner | 294/26 |
| 2,882,084 | 4/1959 | Eatinger | 294/26 |
| 4,660,875 | 4/1987 | Ziegler | 294/26 |
| 5,161,843 | 11/1992 | Baldwin | 294/26 |

FOREIGN PATENT DOCUMENTS

| | | | |
|---|---|---|---|
| 447994 | 4/1948 | Canada | 294/158 |
| 56720 | 1/1923 | Sweden | 294/26 |

*Primary Examiner*—Kurt C. Rowan
*Attorney, Agent, or Firm*—Michael Sand Co.

[57] ABSTRACT

A device for the safe handling of a fish preferably is formed as a one-piece plastic member having a rectangular body formed by two pairs of spaced parallel frame members defining a central opening. A slender, elongated rod is attached to an extended end of the bottom frame member and extends upwardly outwardly therefrom forming a V-shaped space with a front frame member. The rod terminates in a pointed end beyond a top frame member and is adapted to extend through one of the gills and mouth of a fish. A series of gripping recesses are formed in a back frame member to facilitate grasping of the handle by a user.

10 Claims, 2 Drawing Sheets

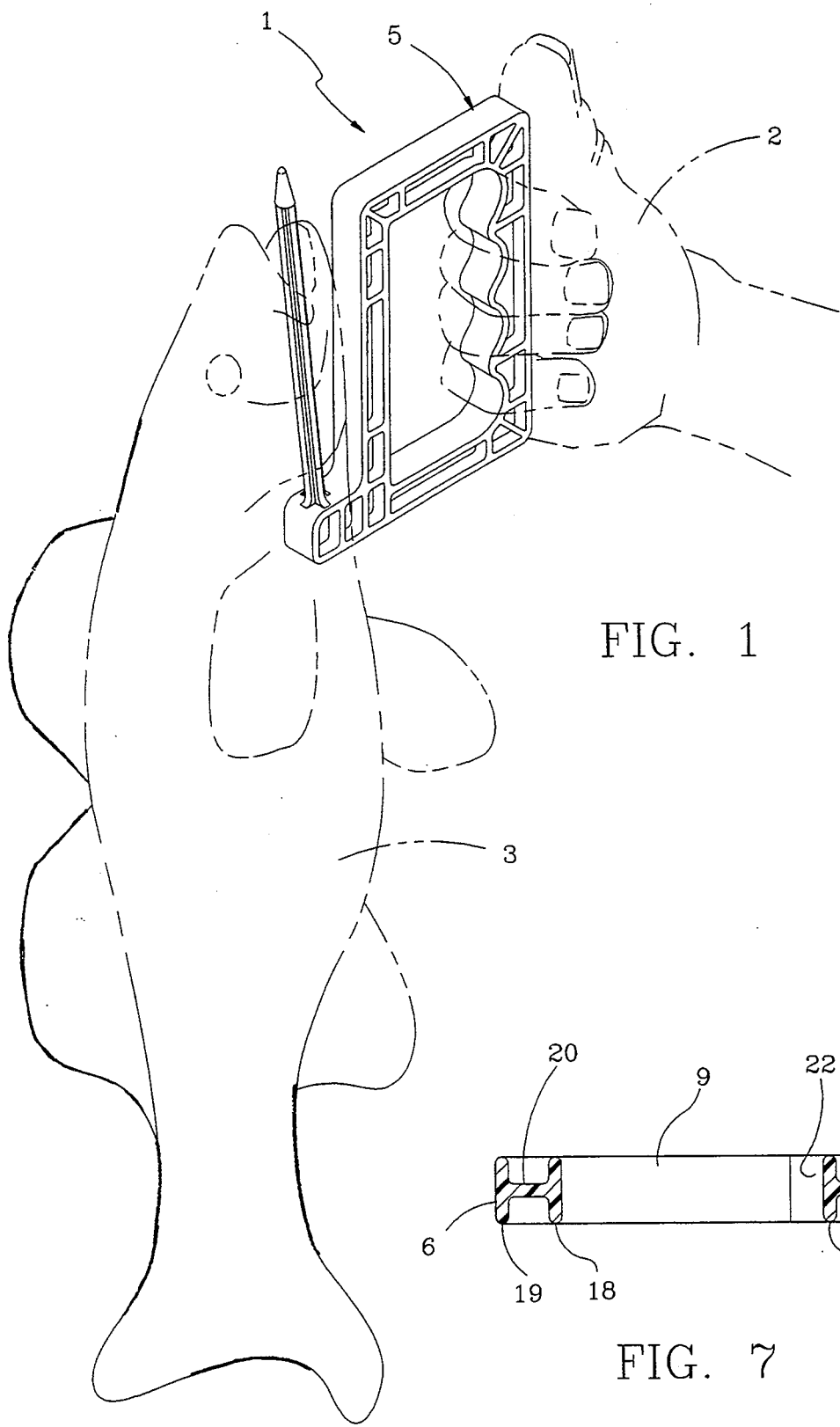

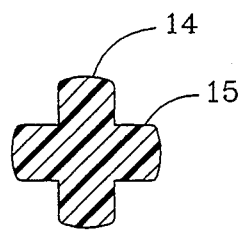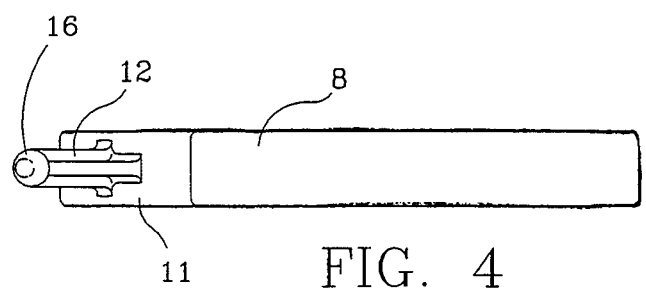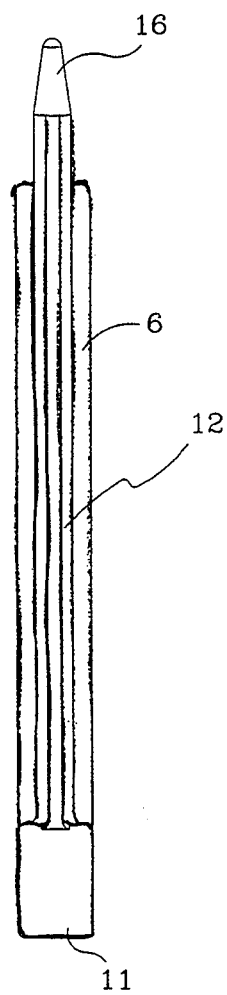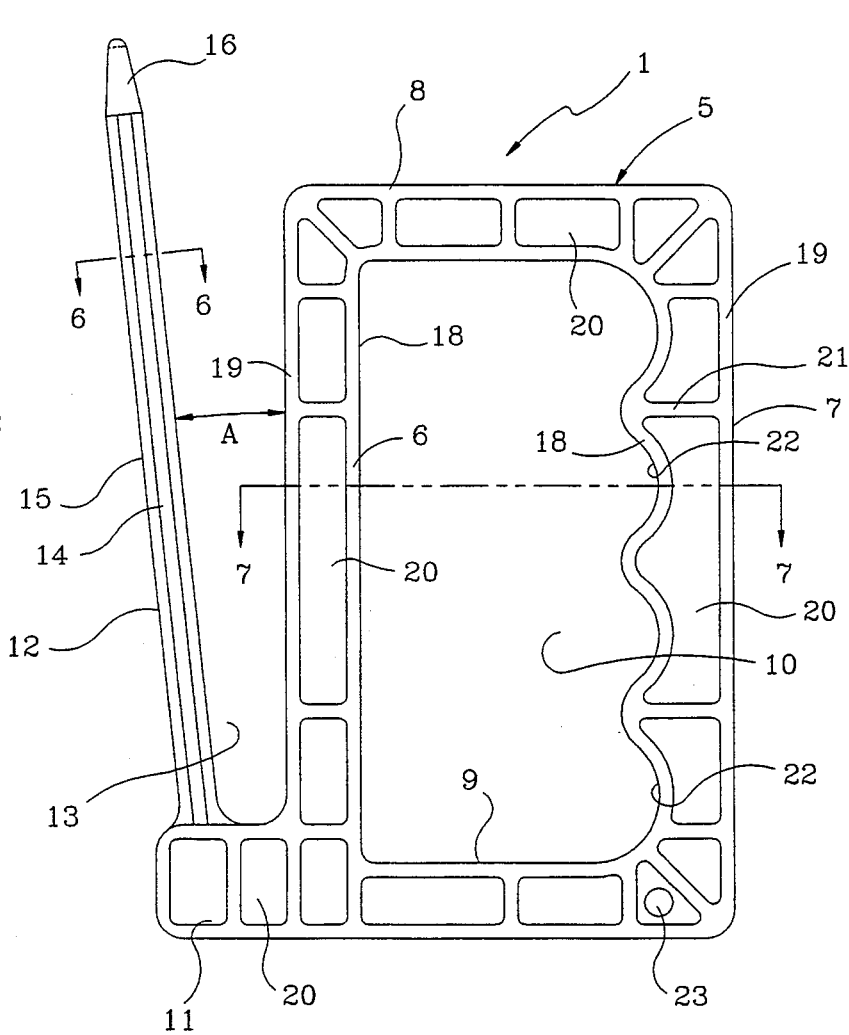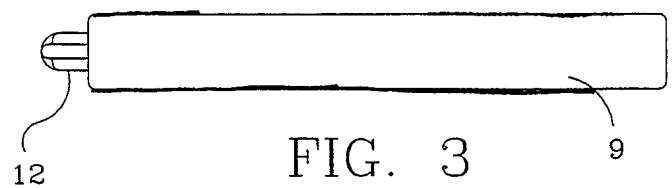

1

FISH HANDLER

BACKGROUND OF THE INVENTION

Technical Field

The invention relates to a fishing device and in particular to a device for the safe handling of fish after being caught by a fisherman. More particularly, the invention relates to such a device having an elongated member which is adapted to extend through one of the gills and mouth of the fish for removing the fish from a net and for the subsequent safe handling thereof.

Background Information

As all fisherman know, it is difficult to remove a fish from a net after catching the fish and for the subsequent safe handling of the fish after removing it from the hook, due to the fins and teeth of many game fish. Fisherman have long used grappling hooks for pulling fish from the water and into the boat, but such hooks are normally used only for very large fish. However, most game fish, such as fresh water fish up to the 50 lb. size, are usually netted by the fisherman and then the fish subsequently removed from the net followed by removal of the hook or vice versa. As indicated above, this presents a problem due to the sharp teeth and fins of many game fish.

Many fisherman will use a glove for safety but this presents a problem in that removal of the hook from the fish's mouth is often difficult. Other types of fish handling devices, such as a pair of clampable jaws which clamps about the exterior body of the fish in order to securely hold the fish and remove it from the net, have also been used. However, such prior art fish clamp handling devices have not proved entirely satisfactory since they are relatively large and bulky and are difficult to operate by the fisherman, especially in the confines of a small boat or when wading in a stream, and when attempting to use it when the fish is in the net.

Therefore, the need exists for an improved device to enable a fisherman to safely handle a fish, and particular to remove a fish from a net after being caught and brought into the boat, onto a dock, or the like.

SUMMARY OF THE INVENTION

Objectives of the invention include providing an improved fish handling device which preferably is formed of a rust-free, lightweight, yet strong and durable plastic, which can be molded in various colors, and which is free of moving parts which are subject to breakage and fouling.

Another objective of the invention is to provide such a fish handling device which is easily grasped by a fisherman, and which has an elongated rod which is easily inserted through one of the fish's gills and out of its mouth to enable the fish to be easily handled; and which will not injure the fish should the fisherman decide to throw the fish back into the water.

Still another objective of the invention is to provide such a fish handling device which can be formed of certain plastic materials having a semi or floatable characteristic thereby preventing loss of the device if dropped into the water, and which is provided with an attachment whereby the device may be easily secured to the body of the fisherman or to the boat by a short section of fishing line or cord, to prevent its loss or misplacement.

A still further objective of the invention is to provide such a fish handling device which includes a safety guard to protect the user's hand after the pickup rod is inserted through the gills and mouth of the fish; and in which the device can be used easily by either a right or left handed fisherman without affecting its intended purpose and use.

These and other objectives of the invention are obtained by the improved fish handling device of the invention, the general nature of which may be stated as including a rigid body forming a handle having an opening formed therein through which a portion of a user's hand extends for gripping the device; and an elongated rod extending in an upwardly outwardly inclined direction from a front portion of the body and terminating in an extended free end and forming a space between said rod and said body, wherein said rod is adapted to extend through the gills and mouth of a fish for safe handling of the fish.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

FIG. 1 is a diagrammatic view showing the manner in which the improved fish handler is intended to be used;

FIG. 2 is a front elevational view of the improved fish handler;

FIG. 3 is a bottom plan view thereof;

FIG. 4 is a top plan view thereof;

FIG. 5 is a front elevational view thereof;

FIG. 6 is an enlarged fragmentary sectional view taken on line 6—6, FIG. 1; and

FIG. 7 is a sectional view taken on line 7—7, FIG. 1.

Similar numerals refer to similar parts throughout the drawings.

DESCRIPTION OF THE PREFERRED EMBODIMENT

The improved fish handler of the present invention is indicated generally at 1, and is shown diagrammatically in FIG. 1 with a fisherman 2 holding a fish 3 by handler 1. Referring particularly to FIGS. 2-7, the fish handler includes a rigid body indicated generally at 5, which forms a handle for grasping by a fisherman. Body 5 has a generally rectangular configuration formed by spaced parallel front and rear frame members 6 and 7, and spaced parallel top and bottom frame members 8 and 9, respectively. The frame members define the perimeter and form a central, generally rectangular shaped opening 10, therebetween.

An end member 11 extends outwardly from bottom frame member 9 beyond front member 6, in a cantilever fashion. An elongated, relatively slender rod 12 is attached to or formed integrally with extended end 11, and extends upwardly outwardly in an inclined manner from end 11 forming a generally V-shaped space 13 with front frame member 6. Rod 12 forms an included angle with frame member 6, generally within the range of between 5°-100° as indicated by arrow A (FIG. 2).

Rod 12 as shown in FIG. 6, preferably has an "X"-shaped cross section formed by two pairs of crossing ribs 14 and 15 which terminate in a conical shaped, generally pointed free end 16.

Handler 1 preferably is formed as an integral one-piece member of injection molded plastic with the frame members 6–9 and extended end 11, being formed with rigid inner and outer borders 18 and 19, with intervening webs 20 of thinner plastic material. A plurality of reinforcing ribs 21 extend between inner and outer borders 18 and 19 at spaced intervals on each of the frame members and extended end 11 to provide a relatively lightweight, yet sturdy handle. It is readily understood that if desired, the plastic material of web 20 could even be eliminated with borders 18 and 19 providing the sole support and structure for the handle.

A plurality of concave recesses 22 preferably are formed on inner border 18 of rear frame member 7 to provide a gripping area around which a user's fingers extend upon grasping rear frame member 7 as shown in FIG. 1. A hole 23 preferably is formed in one area of one of the webs 20, such as in the lower rear corner as shown in FIG. 2, through which a tie string, cord or the like may be attached to enable fish handler 1 to be secured to a boat, dock or to a fisherman's belt to prevent its accidental loss. Likewise, it may be desirable to use one of a readily known number of plastic materials for injection molding handler 1 which provides semi or complete floatability to the handler, so that if it is accidentally dropped into the water, it will not rapidly sink and will be easily retrieved by the fisherman.

The manner of use of fish handler 1 is easily seen by a review of FIGS. 1 and 2. The fisherman grasps rear frame member 7 with his fingers curling around and being located in recesses 22. Pointed end 16 of rod 12 is easily inserted through one of the fish's gills and out of the fish's mouth, preferably while the fish is still in the net. This enables the fish to be easily removed from the net and picked up and carried to any position for subsequent removal of the hook. The portion of the fish's head between the mouth and gill will be trapped in V-shaped space 13 preventing it from easily falling off of rod 12 until the fisherman desires to remove the fish from the rod. Likewise, front frame member 6 protects the fisherman's hand from being cut, either by the gills, fins or teeth of the captured fish.

As shown in FIG. 2, pointed end 16 of rod 12 extends beyond top frame member 8 thereby enabling it to be easily inserted through the fish's gill and mouth, afterwhich the fish will slide along rod 12 and be captured in space 13 without any possible injury to the fisherman since his hand is protected within the rectangular frame of body 5.

Although fish handler 1 is described as being formed as a one-piece integrally molded member, it is readily understood that it could be formed out of other materials, such as a lightweight aluminum, wood, etc. without departing from the concept of the invention. However, plastic is the preferred material since it is lightweight, strong, rust-free and can be molded easily in various colors.

Accordingly, the improved fish handler is simplified, provides an effective, safe, inexpensive, and efficient device which achieves all the enumerated objectives, provides for eliminating difficulties encountered with prior fish handling devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved fish handler is constructed and used, the characteristics of the construction, and the advantageous, new and useful results obtained; the new and useful structures, devices, elements, arrangements, parts and combinations, are set forth in the appended claims.

I claim:

1. A device for handling fish including:
    a rigid body forming a handle having an opening formed therein through which a portion of a user's hand extends for gripping the device; and
    a rod formed integrally on said body in a fixed immovable position to form said device as a one-piece member, said rod extending in an upwardly outwardly inclined direction from a front portion of the body and substantially along the length of said front portion in an acute angular spaced relationship therewith, and terminating in an extended free end, said rod being adapted to extend through one of the gills and mouth of a fish for safe handling of the fish.

2. The device defined in claim 1 in which the body is a generally rectangular frame having spaced front and rear frame members, and spaced top and bottom frame members, said members defining the periphery of the opening.

3. The device defined in claim 2 in which the bottom frame member has an extended front end which extends forwardly beyond the front frame member; and in which the rod is formed integrally with said extended front end and extends upwardly outwardly therefrom.

4. The device defined in claim 3 in which the extended end of the frame extends in cantilever fashion from the front frame member of the body.

5. The device defined in claim 2 in which the rear frame member is formed with a plurality of concave recesses to provide a gripping area for the user's fingers.

6. The device defined in claim 2 in which an attachment hole is formed in one of the frame members.

7. The device defined in claim 2 in which the rod forms an included angle with the front frame member within the range of about 5°–10°.

8. The device defined in claim 2 in which the free end of the rod extends beyond the top frame member.

9. The device defined in claim 2 in which the frame members are formed of molded plastic, each member being defined by a rigid border with an intervening web of material thinner than said border; and in which a plurality of reinforcing ribs extend between the borders of each of the respective frame members.

10. The device defined in claim 1 in which the rod is generally "X"-shaped in cross section; and in which the free end is conical.

* * * * *